United States Patent Office 3,512,993
Patented May 19, 1970

3,512,993
PROCESS FOR MAKING A MEAT CHIP
Frank Conley and Hung Piao Mak, both of 1343 W.
Foster Ave., Chicago, Ill. 60640
No Drawing. Filed Apr. 12, 1965, Ser. No. 447,572
Int. Cl. B02c 18/00; A23l 1/325
U.S. Cl. 99—108                                   3 Claims

ABSTRACT OF THE DISCLOSURE

This specification describes a process for making edible chips or crisps. The base of the product is mixed with equal proportions of potato starch and corn starch formed into the shape of a roll and steamed. After steaming, the roll is dried and sliced. After further drying, the slices are fried in deep fat to produce the finished food product.

---

This invention relates to a method of making edible chips or crisps, and more particularly to a novel method by which such chips may be prepared from a base such as meat, seafood, or the like.

Many processes for preparing potato chips and other vegetable chips have been known in the prior art, most of which require that the food product be sliced very thin and then cooked. These processes are satisfactory for preparing potato chips or the like, but are not suitable for preparing chips formed from a meat or seafood base.

Moreover, chips produced by prior art processes are subject to an aging phenomenon which leaves the chips soggy and unappetizing after a short time. The only way to prevent such aging is to store the chips in an air-tight container, or in a low humidity atmosphere. Although airtight containers are sometimes supplied with potato chips and the like, this naturally adds to the cost of the marketed product, and it is desirable that the need for such a container be eliminated.

A further disadvantage of prior art processes of making chips is that they do not produce an intermediate product which may be readily stored, or easily shipped. The prior art processes instead require that the final chip be produced almost immediately from the raw material, or else preserved in an artificial environment to achieve uniformity of the chips produced. The chips produced by such processes must therefore be distributed in their final form, a relatively large-bulk condition, so that shipping charges are much higher than they would be if the chips were distributed while in a low-bulk condition prior to cooking. It is desirable, therefore, that the process of preparing the chips produce an intermediate product which may be shipped and stored without special attention, in order to reduce shipping charges, and render the product more readily marketable, similar to the familiar domestic unpopped popcorn.

Accordingly, it is a primary object of the present invention to provide a method by which chips may be prepared from a meat or seafood base.

Another object of the present invention is to provide a process for preparing chips which are resistant to aging.

A further object of the present invention is to provide a process for preparing chips in which an intermediate product of relatively high density is produced.

Another object of the present invention is to provide such a process in which the intermediate product does not need a special environment to avoid aging.

A further object of the present invention is to provide a process of preparing chips in which an intermediate product is produced which may be thoroughly dried before being converted into the final form of chip.

An additional feature of the process of the present invention is that the chips produced thereby are extraordinarily light and tender, although crispy, and are easily identifiable as to flavor.

Other objects and advantages of the present invention will become manifest by an examination of the following description and the accompanying claims.

In one embodiment of the present invention, there is provided a method of preparing food products from a meat or seafood base, comprising the steps of comminuting a piece of meat, blending the meat with a small quantity of water, heating the blended mixture, mixing a quantity of starch into the heated mixture to form a dough-like mass, drying the mass, slicing the mass into thin slices, thoroughly drying the slices, and frying the slices in hot fat.

The process of the present invention is applicable to the making of food products with a variety of bases, which may be meat, seafood or the like.

In practicing the process, the first step is the liquefaction of the base from which the chips are to be made, by comminuting and blending small pieces of the product in a commercial blender together with a small quantity of water sufficient to form a liquid mixture. The product is preferably raw when blended, and when the base is beef, for example, the beef is first preferably chopped or ground prior to the blending operation so that the blender need only perform the function of reducing the base substance to a fine texture from a relatively coarse one, instead of reducing the base entirely from a solid form.

When the base substance is thoroughly blended, any desired seasoning or additional flavoring may be added, together with an artificial or non-carbohydrate sweetener. The mixture is then heated in air to its boiling point, and mixed with a quantity of starch. The starch and the hot blended mixture are uniformly mixed together to form a doughy mass, and the mass is promptly formed into the shape of an elongate roll, preferably about an inch in diameter. The roll may be as long as desirable. It has been found that heating the blended mixture facilitates mixing the starch, for the hot blended mixture renders the starch slightly sticky; when the mixture has been mixed uniformly, the mass is cohesive and self supporting. An artificial or non-carbohydrate sweetener is preferred, for when a carbohydrate such as sugar is used, the chips tend to have a burned flavor.

A variety of starches may be used in the formation of the product, but it has been found that a mixture of one-half potato starch and one-half corn starch is most effective.

Tapioca starch can be used instead, but is more expensive than the potato starch and corn starch mixture, and the mixture of potato starch and corn starch is more desirable than either of these starches used alone. When potato starch alone is used, the roll tends to melt and run during the subsequent cooking or steaming step, and when corn starch alone is used, the resulting chips are not sufficiently crispy and light. When the 50–50 mixture is used, however, both of these disadvantages are avoided.

The roll is next cooked in a pressure cooker or the like, preferably at a pressure of 15 pounds per square inch above atmospheric pressure for about 30 minutes. This step renders the chips formed by the process tender and flaky, whereas the omission of this step causes them to be relatively hard and brittle.

After steaming, the roll is allowed to dry in air for a period of about 8 to 12 hours, after which it becomes hard and dry enough to be readily sliced, having a consistency similar to firm cheese. Prior to the completion of 8 to 12 hours drying, the consistency of the roll is more sticky, like cream cheese, and may not be readily sliced for the material tends to stick to the slicing knife; and the pressure of the knife deforms the cross section of the roll, and makes the slices relatively oval in shape, rather than circular as desired. If permitted to dry substantially longer than 12 hours the roll continues to harden and becomes more difficult to slice.

Although longer periods of drying do not appreciably affect the qualities of the chips produced by the process, the 8 to 12 hour period is preferred because it simplifies the slicing step.

Although the drying preferably takes place at room temperature, it may alternatively be accomplished at a refrigerated temperature. Also, the roll may be oven dried at an elevated temperature, by which the drying step may be accomplished more rapidly, but drying at room temperature is preferred, for at this temperature the dried roll tends to have about the same consistency throughout and is not deformed by the slicing process.

The roll is preferably cut into slices having a thickness of about 1/24 of an inch. After the slicing step, the slices are permitted to dry in air until they are substantially entirely dry, and become hard and brittle. While in this condition, they may be stored indefinitely in air, and do not appear to be subject to any aging process which varies the qualities of the chips produced from them.

The dried slices are cooked by immersing them in hot fat or oil, which has been heated to a temperature of about 400° F. The slices readily sink to the bottom of the oil, but soon become heated throughout and swell to many times their original volume, assuming a soft, tender, flaky texture instead of the hard, horny texture of the dried chips. Upon swelling, the chips immediately float to the top of the oil and be removed by ladling or scoping them from the surface. After cooling, the chips are ready to eat.

It is preferably to cook the chips in a light vegetable oil, and the lighter the oil, the better is the taste of the chips produced. Other, heavier oils or fats may be used, such as lard and the like. However, these heavier oils are less satisfactory than a light vegetable oil. The finally formed chips, like the dried slices, do not appear to be subject to any aging process, and may be stored air for long periods without undergoing any noticeable change in flavor or texture.

Before the slices are cooked, the volume of the slices is only a small fraction of the volume of the chips after cooking in hot fat. The dried slices may be conveniently shipped prior to cooking, from the place they are prepared to the place where the slices are to be cooked, thereby effecting a considerable savings in packaging costs, due to the relatively low volume of the uncooked slices. No special provisions for storing them need be taken, and when dry, the slices have a considerable resistance to crushing and breaking, so they may conveniently be packed in bulk without damaging them.

The dried slices may be sold for cooking in the home, at a concession stand, or the like, similar to the manner in which raw popcorn is distributed. Alternatively, the chips may be cooked and distributed in ready-to-eat form, in the same manner as potato chips.

It has been found that the process of the present invention is effective with a wide range of base substances, including, but not necessarily limited to, beef, chicken, shrimp and fish. Chips formed from all of these meat and seafood bases may be prepared by the above described process.

The process of the present invention is also adaptable to making chips from a banana base. When employing a banana base, it is preferable to strain the bananas, in order to remove the seeds and to reduce the fruit to a soft pulpy mass, and the blending step is omitted. The strained mass is mixed with a small amount of water and heated to the boiling point of the mixture, after which the process proceeds as described above, with the heated mixture being mixed with starch and formed into a roll, then steamed, dried and sliced.

The process for producing banana chips may be modified slightly to produce a breakfast food or cereal. When the chips are intended for this purpose, it is preferable to make the roll, formed after combining the heated banana mixture and the starch, of small diameter, so that the slices are of small diameter, and the chips produced from the dried slices are about the same size as the flakes of conventional breakfast foods.

The chips produced by the present invention have fewer calories per unit weight than conventional potato chips. A representative sample of potato chips were found to have 498 calories per 100 grams, with 7.3% protein, 26.5% fat and 49% carbohydrates, whereas the following food values were found in representative chips produced by the present invention.

| Base | Percent | | | Calories per 100 grams |
|---|---|---|---|---|
| | Protein | Carbohydrates | Fat | |
| Beef | 5.0 | 2.2 | 39.2 | 474 |
| Shrimp | 6.5 | 26.8 | 33.4 | 447 |
| Chicken | 5.6 | 28.0 | 34.9 | 461 |
| Fish | 10.7 | 31.0 | 31.3 | 456 |
| Banana | 1.7 | 26.9 | 29.4 | 391 |

From the foregoing, the present invention has been described in sufficient detail to enable others skilled in the art to make and use the same, and, by applying current knowledge, to adapt the same for use with different bases and under different conditions of service.

What is claimed is:

1. A process for forming an intermediate product from which an edible food chip may be prepared, consisting of the steps of finely comminuting a meat or seafood base material, mixing said base material with a quantity of water, heating said mixture, adding to said heated mixture a starch mixture comprising 50% potato starch and 50% corn starch to form a doughy mass, shaping said mass into a roll form, cooking said roll at a pressure of about 15 pounds per square inch above atmospheric pressure for about 30 minutes, drying said mass in air at room temperature for a period of 8 to 12 hours until it may be readily sliced, and slicing said mass into slices.

2. A process of making an edible food chip, consisting of the steps of heating a liquid meat or seafood base substance, adding to said heated base substance a mixture of 50% potato starch and 50% corn starch to form a doughy mass, shaping said mass into a roll form, cooking said roll in a pressure cooker for about 30 minutes at about 15 pounds per square inch above atmospheric pressure, drying the cooked roll in air at room temperature for 8 to 12 hours, slicing said roll into thin slices, drying said slices until thoroughly dry, and submerging said slices in oil at 400° F. until said slices are puffed up into chips.

3. A process for making food products consisting of the steps of comminuting a solid meat or seafood base material with a quantity of water sufficient to form a liquid mixture, admixing an artificial sweetener, heating said mixture to its boiling point, adding to said heated mixture a quantity of a starch mixture to form a doughy mass, said starch mixture comprising 50% potato starch and 50% corn starch, forming said mass into an elongate circular roll of about one inch in diameter, cooking said roll at a pressure of about 15 pounds per square inch above atmospheric pressure for about 30 minutes, drying said roll in air at room temperature for 8 to 12 hours, slicing said roll into equal circular slices having a thickness of about 1/24 inch, and thoroughly drying said slices.

References Cited

UNITED STATES PATENTS 2,168,246   8/1939   Shepherd.
3,282,701   11/1966   Wong et al.
3,297,450   1/1967   Loska _____ 99—100

HYMAN LORD, Primary Examiner

U.S. Cl. X.R.

99—111